(12) United States Patent
Shebs (10) Patent No.: US 7,836,430 B2
(45) Date of Patent: Nov. 16, 2010

(54) REVERSING EXECUTION OF INSTRUCTIONS IN A DEBUGGER

(75) Inventor: Stanley T. Shebs, Las-Vega, NV (US)

(73) Assignee: Apple Inc., Cupertino, CA (US)

( * ) Notice: Subject to any disclaimer, the term of this patent is extended or adjusted under 35 U.S.C. 154(b) by 1152 days.

(21) Appl. No.: 11/490,703

(22) Filed: Jul. 21, 2006

(65) Prior Publication Data

US 2008/0066055 A1    Mar. 13, 2008

(51) Int. Cl.
G06F 9/44 (2006.01)
(52) U.S. Cl. .................. 717/124; 717/125; 717/127; 717/128; 717/129
(58) Field of Classification Search .............. 717/124, 717/125, 127–129
See application file for complete search history.

(56) References Cited

U.S. PATENT DOCUMENTS

2005/0246690 A1* 11/2005 Horton et al. ............... 717/125

OTHER PUBLICATIONS

Samuel T. King, George W. Dunlap, and Peter M. Chen, "Debugging operating systems with time-traveling virtual machines" Usenix '05 (15 pages).
S. I. Feldman and C. B. Brown, "IGOR: a system for program debugging via reversible execution" In Proceedings of the 1988 ACM SIGPLAN/SIGOPS Workshop on Parallel and Distributed Debugging, pages, Nov. 1988 (pp. 112-123).
James S. Plank, Micah Beck, Gerry Kingsley and Kai Li, "Libckpt: Transparent Checkpointing under Unix"available at http://www.cs.utk.edu/%7Eplank/plank/papers/USENIX-95W.html, Conference Proceedings, Usenix Winter 1995 Technical Conference, New Orleans, LA, Jan. 1995 (pp. 213-223).
D. Pan and M. Linton. "Supporting Reverse Execution of Parallel Programs" SIGPLAN/SIGOPS Workshop on Parallel and Distributed Debugging, May 1988 (pp. 124-129).
"Using reverse execution" discussion thread, initiated Sep. 12, 2005 on a gdb mailing list, available starting at http://sources.redhat.com/ml/gdb/2005-09/msg00080.html (last accessed Jul. 21, 2006) (81 pages).
Lewis, Bil, "Debugging Backwards in Time," [online]. Mar. 2003, pp. 1-15. Retrieved from the Internet: http://www.lambdacs.com/debugger/AADEBUG_Mar_03.pdf.
Lewis, Bil, "Omniscient Debugging," [online] Feb. 18, 2007, 4 pages. Retrieved from the Internet: http://www.lambdacs.com/debugger/debugger.html.

* cited by examiner

*Primary Examiner*—Wei Y Zhen
*Assistant Examiner*—Qamrun Nahar
(74) *Attorney, Agent, or Firm*—Fish & Richardson P.C.

(57) ABSTRACT

A method can include receiving navigational debug input from a debugger interface including input to traverse input code in a plurality of modes; in response to receiving the navigational debug input, a) saving state of a program being executed in a corresponding debugger, including creating a child process from a currently executing process, and b) executing a portion of the program, wherein executing the portion of the program comprises suspending the created child process, and continuing to execute the currently executing process; receiving input to reverse execution of the portion of the program; and restoring the saved state of the program, wherein restoring the saved state of the program comprises suspending the currently executing process and activating the suspended child process. The navigation input can include input to single-step, step over a function, step into a function or set a breakpoint in programming code running within the corresponding debugger.

18 Claims, 5 Drawing Sheets

REVERSING EXECUTION OF INSTRUCTIONS IN A DEBUGGER

BACKGROUND

This specification relates to debuggers.

A computing system may perform numerous operations, including receiving input; processing the received input, or other data in response to the received input; and providing output. For example, a general purpose computer may receive input from a keyboard, mouse, touch screen, voice command processor or input sensor; process the received input to manipulate, for example, text or graphics in a document, numbers in a spreadsheet, entries in a database, or data of various forms (e.g., multimedia) retrieved from various sources (e.g., a network), or otherwise control other devices (e.g., other computing devices, other machines, input or output devices, etc.); and provide output, for example, in the form of graphical output on a display screen, audio output from a sound-producing device, hard copy output from a printing device, digital output to a storage device, or control output to control a physical machine.

To receive input, process the input and provide output, the computing system may employ a combination of physical resources (e.g., "hardware") and various levels of programming code (e.g., "software"). For example, the computing system may employ hardware such as a controller or microprocessor, physical memory and various input and output devices. The computing system may also employ an operating system that interacts directly with and manages the hardware and various application programs that run on top of the operating system and that perform operations involving receiving input, processing the input and providing output.

SUMMARY

Because of the typical complexity of application programming code that is used to implement many computing applications, and because of the complexity of underlying hardware and software on which the application programming code may be executed, application developers can employ a debugger to incrementally analyze and debug the application code. A debugger can enable the developer to execute small portions of the application programming code, in various modes, and to observe the effect of the execution of the small portions on the underlying hardware and software. For example, the debugger can enable the developer to set a "breakpoint" in the code; the debugger can execute code before the breakpoint, then pause execution of the code at the breakpoint to allow the developer to inspect variables or files maintained by the code or to inspect lower-level resources such as registers or pointer values maintained by, for example, hardware registers. As another example, the debugger can enable the developer to "single-step" through code to see the effect of execution of single instructions or small groups of instructions. As another example, the debugger can enable the developer to "step over" a particular module of code (e.g., a function) to allow the developer to analyze the effect of execution of the particular module of code without forcing the developer to pause at each instruction or group of instructions in the module of programming code. As another example, the debugger can enable the developer to "step into" a particular module of code to allow the developer to analyze in greater detail the effect of execution of small portions of the code.

In some implementations, the debugger can also enable the developer to "undo" an operation previously performed by the debugger (e.g., execution from a first breakpoint to a second breakpoint, performance of a single operation, performance of a step-over operation, performance of a step-into operation, etc.) To undo the previously performed operation, the debugger can cause the programming code and underlying hardware and software to be reset to a previous state without re-executing a potentially large preceding portion of the code. Such a feature may be particularly useful if the previously executed code caused a serious or fatal error in execution that may otherwise force the developer to restart the debugging operation.

In some implementations, a method includes receiving navigational debug input from a debugger interface including input to traverse input code in a plurality of modes; in response to receiving the navigational debug input, a) saving state of a program being executed in a corresponding debugger, including creating a child process from a currently executing process, and b) executing a portion of the program, wherein executing the portion of the program includes suspending the created child process, and continuing to execute the currently executing process; receiving input to reverse execution of the portion of the program; and restoring the saved state of the program, wherein restoring the saved state of the program includes suspending the currently executing process and activating the suspended child process. The navigation input can include input to single-step, input to step over a function, input to step into a function or input to set a breakpoint in programming code running within the corresponding debugger.

In some implementations, a method includes executing a program in a debugger; receiving navigational debug input from a corresponding debugger interface; in response to receiving the navigational debug input, a) saving state of the program being executed in the debugger, and b) executing a portion of the program; receiving input to reverse execution of the portion of the program; restoring the saved state of the program; and continuing execution of the program based on the restored saved state.

Receiving navigational debug input can include receiving input to single-step, step over a function, step into a function or set a breakpoint in programming code running within the debugger. Saving state of the program can include forking a process corresponding to a currently executing process; suspending the forked process; and continuing to execute the currently executing process. Saving state of the program can include saving at least one of current register values of a processor executing the program, a value of an instruction counter that stores addresses of successively executed instructions as the processor executes the program or a value of a stack pointer that points to a portion of a stack employed by the processor. Restoring the saved state of the program can include suspending the currently executing process and activating the suspended forked process. Receiving input to reverse execution of the portion of the program can include receiving input corresponding to selection of a reverse-execution icon in the debugger interface.

The method can further include determining whether execution of the portion of the program comprises writing to or reading from shared memory or writing to or reading from an input/output interface. The method can further include displaying the reverse-execution icon in a first format if execution of the portion of the program comprises writing to or reading from the shared memory or writing to or reading from the input/output interface, and displaying the reverse-execution icon in a second format if execution of the portion of the program does not comprise writing to or reading from the shared memory or writing to or reading from the input/output interface. In some implementations, the first format includes a first coloring, and the second format includes a second coloring; for example, the first coloring can be red and/or the second coloring can be green.

The method can further include saving supplemental state if execution of the portion of the program comprises writing to or reading from the shared memory or writing to or reading from the input/output interface, the supplemental state comprising a value read from or written to the shared memory or the input/output interface. The method can further include receiving input to re-execute the portion of the program after receiving input to reverse execution of the portion of the program, and re-executing the portion of the program in response to receiving the input to re-execute the portion. Re-executing the portion of the program can include re-executing only those instructions in the portion of the program that do not write to or read from shared memory or write to or read from an input/output interface.

The method can further include displaying a value from the supplemental state corresponding to an instruction that is not re-executed. The method can further include displaying a re-execution icon in the debugger interface, wherein receiving input to re-execute the portion of the program comprises receiving user input selecting the re-execution icon. Displaying the re-execution icon can include displaying the re-execution icon in a first format if any instruction in the portion of the program includes writing to or reading from shared memory or writing to or reading from an input/output interface, and displaying the re-execution icon in a second format if no instruction in the portion of the program comprises writing to or reading from shared memory or writing to or reading from an input/output interface.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
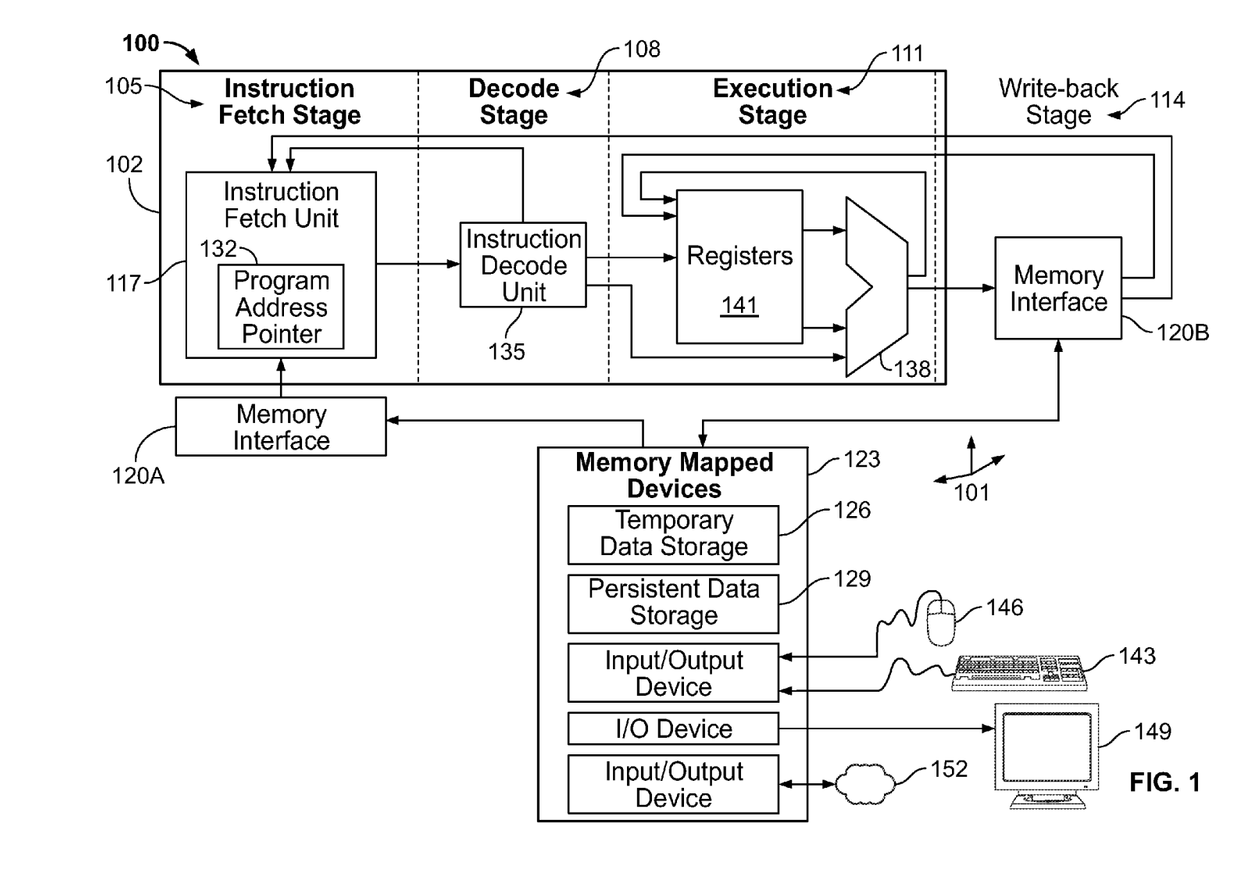
FIG. 1 is an exemplary block diagram of resources in a computing system that can reverse execution of certain programming instructions.

FIG. 1 is a block diagram of resources 101 that are included in an exemplary computing system 100. In some implementations, some of the resources 101 are included in a single device, such as a microprocessor 102 or a microcontroller. In operation, the resources 101 execute individual programming instructions to implement one or more computing applications. Execution of the programming instructions can be "reversed" in a debugger, using the systems and techniques described in this document. In some implementations, as shown in FIG. 1, programming instructions are processed in four phases: an instruction fetch stage 105, a decode stage 108, execution stage 111 and an optional write-back stage 114. Other numbers and types of stages are possible, and not all stages are required; for example, the write-back stage 114 is omitted in some implementations.

To fetch instructions in the instruction fetch stage 105, the computing system 100 can use an instruction fetch unit 117, a memory interface 120A, and one or more "memory-mapped" devices 123 that store the instructions to be fetched. In some implementations, as shown, the memory-mapped devices 123 include temporary data storage 126 and persistent data storage 129. The temporary data storage 126 can be volatile memory such as SDRAM (synchronous dynamic random access memory), DDR (double data rate) memory devices or other memory devices that provide relatively fast access to data while the computing system 100 is powered. The persistent data storage 129 can be nonvolatile storage such as a hard disk drive or optical drive that retains data even when the computing system 100 or persistent data storage 129 device is not powered. Typically, the persistent data storage 129 has a larger capacity than the temporary data storage 126, but the persistent data storage 129 can also have longer data access times than the temporary data storage 126. In some implementations, the computing system 100 transfers programming instructions from the persistent data storage 129 to the temporary data storage 126 to facilitate faster access to programming instructions that are to be currently or imminently executed.

As depicted in FIG. 1, the instruction fetch unit 117 retrieves programming instructions from one of the memory-mapped devices 123 through the memory interface 120A. The memory interface 120A can receive an address that specifies a memory location (e.g., a memory location that stores a programming instruction) and access a specific memory device corresponding to the specified memory location. In some implementations, the memory interface 120A includes a memory manager (not shown) that decodes and resolves addresses to individual memory devices based on a global memory map. In some implementations, the memory interface 120A includes discrete address decoding logic that can be included in the specific memory devices themselves.

To track the next instruction to fetch, the instruction fetch unit 117 can, in some implementations, use a program address pointer 132—sometimes referred to as an instruction pointer or program counter. Typically, the program address pointer 132 stores or "points to" an address of the next instruction to be fetched. In some implementations, the program address pointer 132 is automatically incremented by a fixed number each time an instruction is retrieved. The fixed number may depend on the number of bytes that are included in each instruction. For example, in a system in which individual bytes are accessible and in which instructions are four-byte words, the program address pointer 132 can be automatically incremented by four each time an instruction is fetched. The program address pointer 132 can also be adjusted by other stages based, for example, on the contents of fetched instructions. In particular, the decode stage 108 can decode "branch" or "jump" or "call" instructions and can cause the program address pointer 132 to be adjusted based on contents of an immediate value included in instructions; the execution stage 111 or write-back stage 114 can retrieve a value from one of the memory-mapped devices 123 or from a register (registers described in more detail below) and cause this value to be stored in the program address pointer 132.

Once an instruction is fetched, the instruction can be decoded in the decode stage 108 by, for example, an instruction decode unit 135. In some implementations, the instruction decode unit 135 can parse each instruction into, for example, an operation code (opcode), register operands or immediate values. Opcodes are, in some implementations, numeric codes that represent instructions that are predefined for a particular microprocessor or family of microprocessors. Based on the opcode, the instruction decode unit 135 can control other aspects of the computing system 100—in particular, an execution unit 138.

The execution unit 138 can perform various operations on input operands to produce an output value. The operations can include, for example, mathematical operations (e.g., add, subtract or multiply), logical operations (e.g., AND, OR, XOR, NAND), or bit-shifting operations. In some implementations, the execution unit 138 includes an arithmetic logic unit (ALU) (not shown) or a floating point unit (FPU) (not shown) to perform the above-described operations. Generally, the execution unit 138 receives the input operands from registers 141, and the specific registers from which the execution unit 138 receives input and the specific operation to perform can be specified by the instruction decode unit 135. As an example, a sequence of instructions may cause the execution unit 138 to add a first number to a second number. In particular, a first instruction may cause the first value to be stored in a first register (register "R1" (not shown)); a second instruction may cause the second value to be stored in second register (e.g., register "R2" (not shown)); a third instruction may cause the execution unit 138 to add the values stored in R1 and R2 and save the result in a third register (e.g., register "R3" (not shown)).

Because results of execution of some instructions may be stored in memory, rather than in a register, the computing system 100 includes a memory interface 120B. As shown, the memory interface 120B is included in the write-back stage 114. The memory interface 120B can cause data to be stored in one of the memory-mapped devices 123. In some implementations, the memory interface 120B also can retrieve data from one of the memory-mapped devices 123 and store the retrieved data in one of the registers 141, or, as described above, in the program address pointer 132.

The memory interface 120B and the memory interface 120A can be part of the same overall memory interface, or the memory interfaces 120B and 120A can be separate interfaces. Moreover, the memory-mapped devices 123 can be mapped in one or more "address spaces." For example, a "von Neumann architecture" employs a single memory space for both data and instructions, whereas a "Harvard architecture" employs separate memory spaces for data and instructions.

In operation, the computing system 100 can retrieve a sequence of programming instructions and decode and execute the instructions to perform operations that together make up a "computing application." Typically, the computing application involves interaction with a user or another device, and to facilitate such interaction, the computing system 100 includes various input/output devices, of which a keyboard 143, pointing device 146, video display 149 and network interface 152 are examples. The computing system 100 can interface with many other input/output devices that are not shown (e.g., printing devices, networked storage facilities, voice-command processors, machine sensors and actuators, etc.)

As shown, the various input/output devices are memory-mapped. That is, the execution unit 138 receives input from a device such as the keyboard 143 or pointing device 146 by retrieving data from a memory-mapped location corresponding to the input device. Similarly, the execution unit 138 provides output to a device such as the video display 149 by writing data to a memory-mapped location corresponding to the output device. Other input and output schemes not involving memory-mapped devices are also possible but are not illustrated in the figures or described in detail, as any suitable input/output scheme can be used.

At any given time, the computing system 100 has a "state" that characterizes its operation. In some implementations, the state includes current values of the registers 141, information that characterizes pending instructions (e.g., information from the instruction decode unit 135) and information about instructions that are about to be fetched (e.g., contents of the program address pointer 132). State can be important to the operation of the computing system 100 in cases where execution of a sequence of instructions is "interrupted." For example, the computing system 100 may be required to process an "interrupt"—a possibly asynchronous event that may be of higher priority than the currently executing sequence of instructions and that may require substantially immediate attention. To process the interrupt, the computing system 100 saves its current state, processes the interrupt, then restores the saved state and continues processing the sequence of instructions where it left off before the interrupt, as captured by the saved and restored state. As another example, a first sequence of instructions may repeatedly "call" a second sequence of instructions (e.g., a function or procedure) to perform a specific operation. Before "calling" the second sequence of instructions, the computing system 100 can save its current state, execute the second sequence of instructions, then restore the state and continue executing the first sequence of instructions based on the restored state. As described with reference to FIG. 2, state can also be used to allow the computing system 100 to execute several computing applications seemingly simultaneously.

Figure 2:
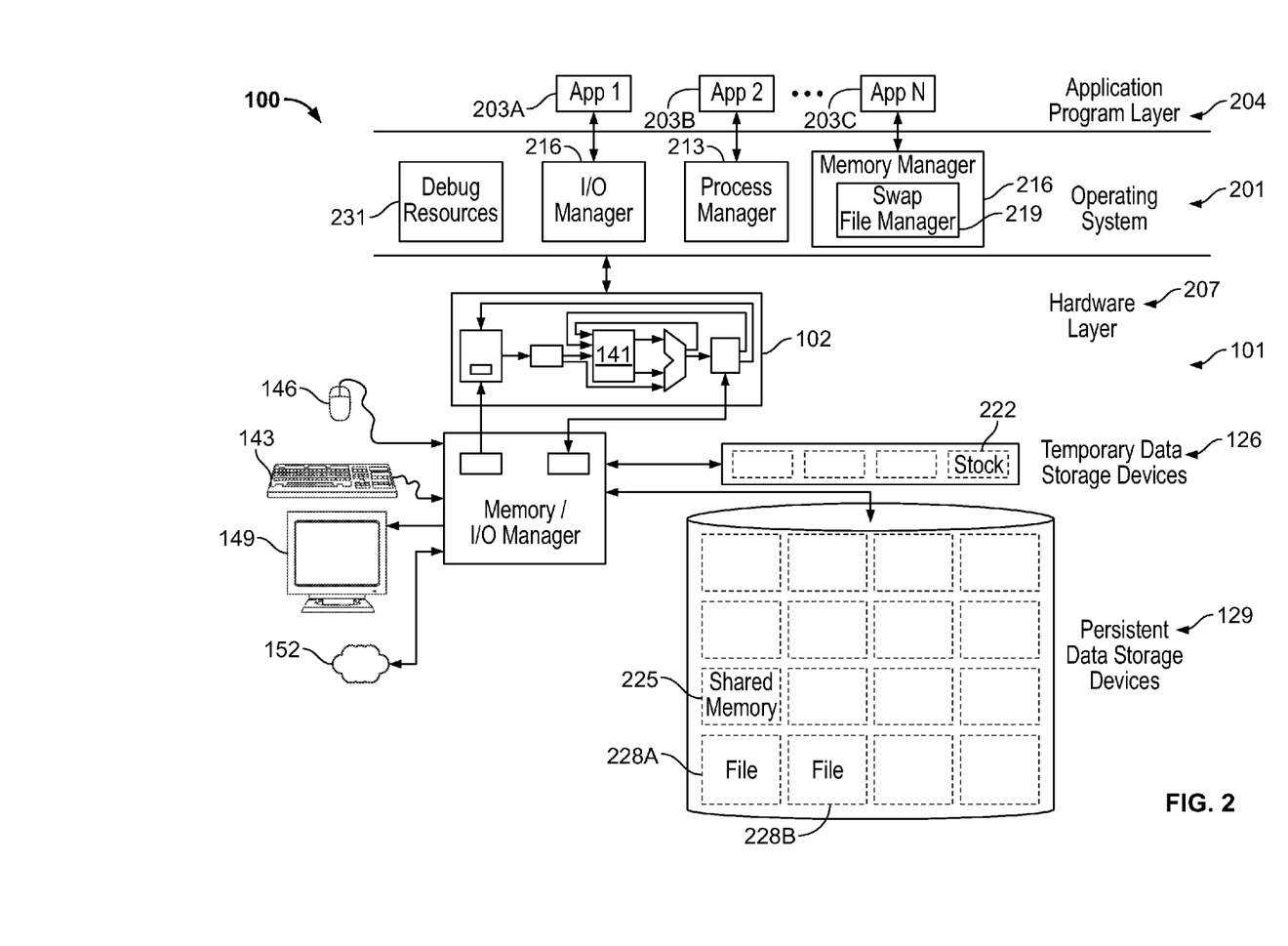
FIG. 2 is a block diagram showing additional details of the resources that are shown in FIG. 1 and further showing additional resources that can be included in the computing system.

FIG. 2 conceptually illustrates an operating system 201 layer and a number of computing applications 203A, 203B and 203C in an application program layer 204; FIG. 2 also illustrates additional details of the resources 101 shown in FIG. 1, in a layer 207. As described below, the operating system 201 can execute the computing applications 203A-C seemingly simultaneously. Also as described below, the operating system 201 and resources 101 can facilitate "reverse execution" of programming instructions.

In some implementations, the operating system 201 is the lowest-level software run by the computing system 100; generally, the operating system 201 directly interacts with the resources 101 and provides an "abstraction layer" to higher-level software applications, such as applications 203A, 203B or 203C. That is, the operating system 201 can provide a standardized interface to the resources 101, regardless of the exact architecture or specifications of those resources. For example, the operating system 201 can employ an I/O manager 210 to provide application programs with a standard interface for displaying output to the video display 149 or for receiving input from pointing device 146. The interface can be standard in the sense that common commands can be used, in some implementations, to provide output to, for example, a 19" flat panel display produced by one manufacturer or a 15" CRT display provided by a second manufacturer. To convert commands received by such a standard interface, the I/O manager 210 can employ various specific "drivers" (not shown), which can be transparent to the application programs that provide output to the video display 149. Similarly, the I/O manager 210 can employ other specific drivers to facilitate a common application programming interface ("API") to the pointing device 146, regardless of whether the pointing device 146 is, for example, a two-button wired mouse, or a wireless three-button mouse with a track wheel.

As shown, the operating system 201 employs a process manager 213 and a memory manager 216 to efficiently manage the resources 101 and allow many application programs to run seemingly simultaneously. In some implementations, the process manager 213 allocates application program access to certain resources 101 (e.g., the microprocessor 102) in "time slices." That is, each application or task can be allocated a slice of time during which programming instructions corresponding to that application or task are executed. At the end of the time slice, the process manager 213 can save state associated with the programming instructions associated with the time slice, and start a new time slice, in which different programming instructions corresponding to a different application or task can be executed. (In the context of the operating system 201, "state" generally includes more than just current values of registers in the microprocessor 102 or information about instructions that to be fetched; additional aspects of state will be described further below.) After all pending applications or tasks have received access to the microprocessor, the process manager 213 can repeat the process, restoring saved state as appropriate and allocating access to different applications or tasks in sequence. In this manner, a large number of applications or tasks can be executed over a short period of time, even in systems having only a single microprocessor 102 or a single execution data path.

Because each application or task may require a substantial amount of temporary data storage 126 ("memory"), the operating system 201 can, in the implementation shown, employ a memory-manager 216 to ensure that each time slice has sufficient memory for the programming instructions to be executed in that time slice. In some implementations, the memory is partitioned into units called "pages," and varying number of pages of temporary data storage 126 are assigned to each application programmer task, based on the amount of memory required by that application or task. If the total number of pages required by all of the pending application programs or tasks exceeds the available capacity of the temporary data storage 126 (the "physical memory"), the memory manager 216 can employ a swap file manager 219 to "swap" an inactive page in the temporary data storage 126 (e.g., a page associated with an application program or task that does not currently have access to the microprocessor 102) with another page from the persistent data storage 129 (sometimes referred to as "virtual memory"). In this manner, currently executing application programs and tasks can have access to an amount of virtual memory that exceeds an amount of actual memory in temporary data storage 126. To maintain good performance, (e.g., low access times for data required by application programs and tasks with current access to the microprocessor), the swap file manager 219 can ensure that appropriate pages are always loaded in the temporary data storage 126.

In some implementations, different applications or tasks may need to communicate with each other by passing data back and forth. To do so, the operating system 201 can, in some implementations, use a stack 222 or shared memory 225. The operating system 201 can allow a first application to "push" data on to the stack 222 and allow a second application to "pop" the data off the stack 222 in order to facilitate data transfer (communication) from the first application to the second application. Similarly, the operating system 201 can configure a portion of shared memory 225 to be used as a communication facility between two or more applications or tasks.

As shown, the stack 222 is included in the temporary data storage 126 and the shared memory 225 is shown in the persistent data storage 129, but this arrangement could be reversed; or shared memory and a stack could be allocated in both the temporary data storage 126 or the persistent data storage 129. In some implementations, one or more of the registers 141 holds information about the stack 222 (e.g., one register not shown may serve as a dedicated "top of stack" pointer), and this information can be included in the state information that is saved and restored.

Some applications may process data files (e.g., data files 228A or 228B), which can be stored in the persistent data storage 129, as shown, or in the temporary data storage 126. Information about data files 228A-B is also included in state information that is saved and restored. In particular, the state information includes, in some implementations, files that are "open" and in use by particular application programs or tasks, and can include pointers that identify particular locations within the data files to which information should be written to or read from next.

In some implementations, the operating system 201 (as shown) or one or more applications (not shown) includes debug resources 231. The debug resources 231 can include a user interface by which a user (e.g., a developer) can debug code corresponding to different tasks, the operating system 201 or one or more of the application programs 203A, 203B or 203C. In particular, the debug resources 231 can include the ability to control execution of individual programming instructions or groups of programming instructions. Example controls can include "single stepping" (e.g., executing one instruction then pausing the execution); setting a "breakpoint" and executing programming code up to the breakpoint; "stepping over" code (e.g., executing certain code, such as programming code corresponding to a function or procedure, then resuming a single-step mode after the stepped-over code has been executed); "stepping into" code (e.g., executing certain code, such as programming code corresponding to a function or procedure in a single-step mode); or performing some other debug function. A corresponding debugger can also display various aspects of computing system 100 state at different times. For example, the debugger interface can, in some implementations, display register values, stack pointer(s) or stack contents, contents of shared memory, information about currently executing processes, information about open files, pointers within such files, states of physical or virtual memory, or other information that may be useful to a developer debugging programming code.

In some implementations, the debug resources 231 are integrated in the operating system 201. In some implementations, specific debug features can be included in application programming code (e.g., applications 203A-C) if the programming code is compiled in a certain manner (e.g., with debug flags set) or with a certain compiler (e.g., a special purpose debugging compiler). Various exemplary debugger features are now further described with reference to FIG. 3.

Figure 3:
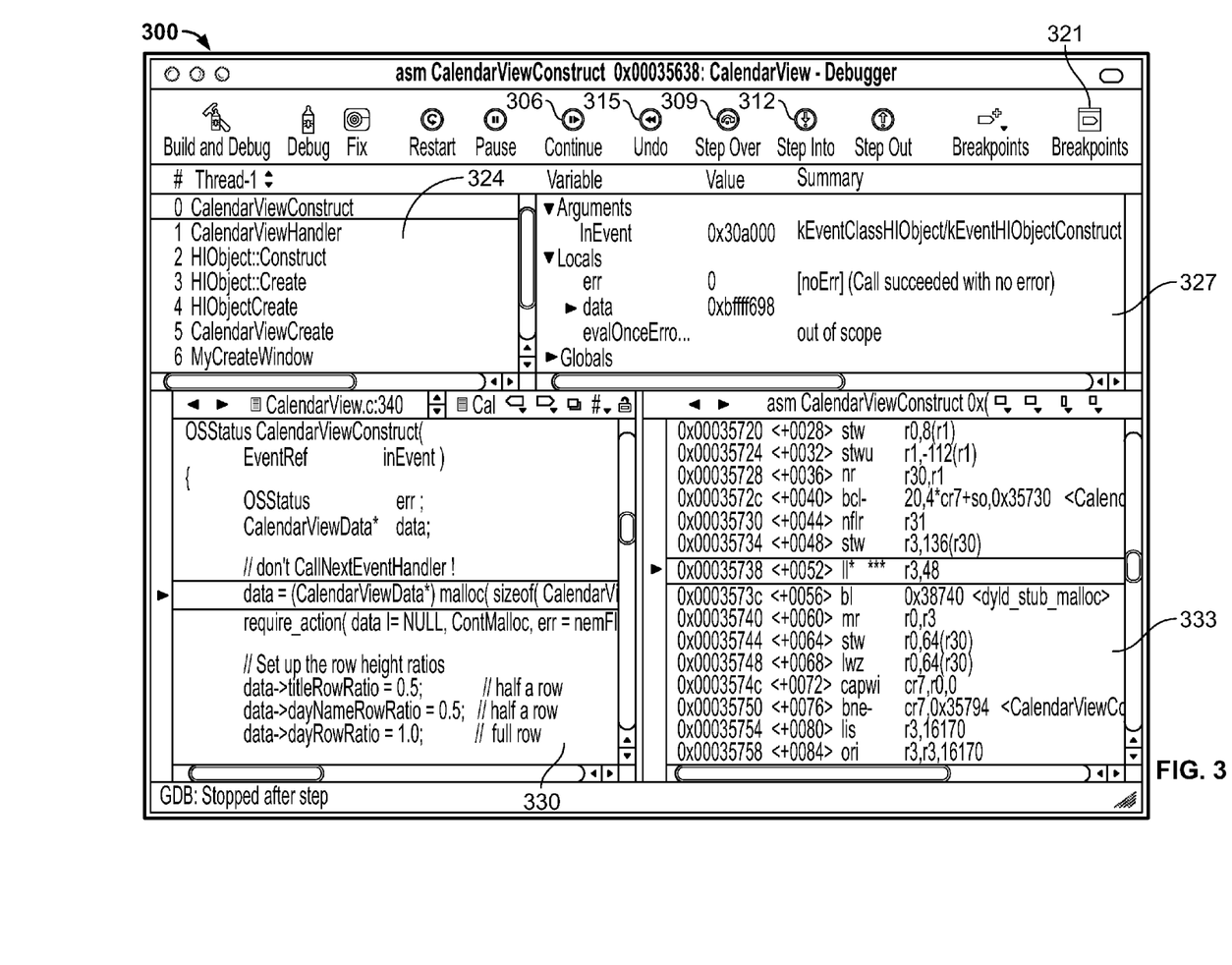
FIG. 3 is a screen shot of an example debugger interface that can be used to reverse execution of certain programming instructions.

FIG. 3 is a screenshot showing an example debugger interface 300 that can be used to reverse execution of certain programming instructions. As shown, the debugger interface 300 includes a main control toolbar 303 that includes selectable controls to enable a user to provide navigational input to the debugger. Example selectable controls include a single-step control 306, a step-over control 309, a step-into control 312, an undo control 315 and a breakpoint control 321. Each control can receive navigational input from a user that causes the debugger to perform a debug operation. For example, the single-step control 306 can cause the underlying resources 101 (see FIG. 2), under the control of the debugger, to execute individual programming code instructions. The step-over control 309 can cause the underlying resources 101 to execute programming code associated with a function or procedure in a non-single-step execution mode or return to a single-step mode following execution of the stepped-into function. The undo control 315 can cause the debugger to "undo" a previous operation and restore the underlying resources 101 to a preceding state, as described in further detail below. Other controls can cause other debug operations to be performed. For example, some implementations include a "redo control" (not shown), as described in further detail below.

The user interface 300 includes various information frames to allow a developer or other debugger user to track information about execution of certain programming instructions. For example, a thread/process frame 324 can display information about various processes or threads that are tracked and periodically executed by the operating system 201. A variables frame 327 can display information about variables or files maintained by software constructs (e.g., in the currently executing application programming code or in the operating system 201) or by the microprocessor 102 (e.g., register values or stack pointer values). A high-level code frame 330 can display information about lines of high-level code that are currently being executed; a machine code frame 333 can display information about corresponding lines of machine code.

As used in this document, "high-level" code refers to programming code that is written in a so called "high-level" programming language, such as, for example, a compiled programming language like C or C++, or an interpreted programming language, like JAVA. High-level languages generally abstract the actual operation of the microprocessor that executes the programming code. In contrast, low-level, or "machine code" languages refers here to programming code that is less abstract and more tied to the specific microprocessor that executes the programming code. In particular, machine code generally is in the form of the native instructions of the specific microprocessor and refers to specific registers employed by that microprocessor.

In some implementations, many lines of machine code correspond to a single line of high-level programming code. In some implementations, programming code can be single-stepped at either the high-level programming language level or the machine code level. When code is single-stepped at the machine code level, a developer who monitors the various information provided by the debugger can see the effect of each machine code programming instruction or the state of the computing device. When programming code is single-stepped at the high-level programming language level, some implementations of the debugger interface 300 display the overall effect of execution of a line of high-level programming code; other implementations automatically step through individual lines of the corresponding machine code at a user selectable rate, allowing the user to see the effect of execution of programming code at a finer level of detail. The debugger interface 300 shown in FIG. 3 is merely exemplary; the debugger interface can be configured differently and can include different controls and provide different information.

Figure 4:
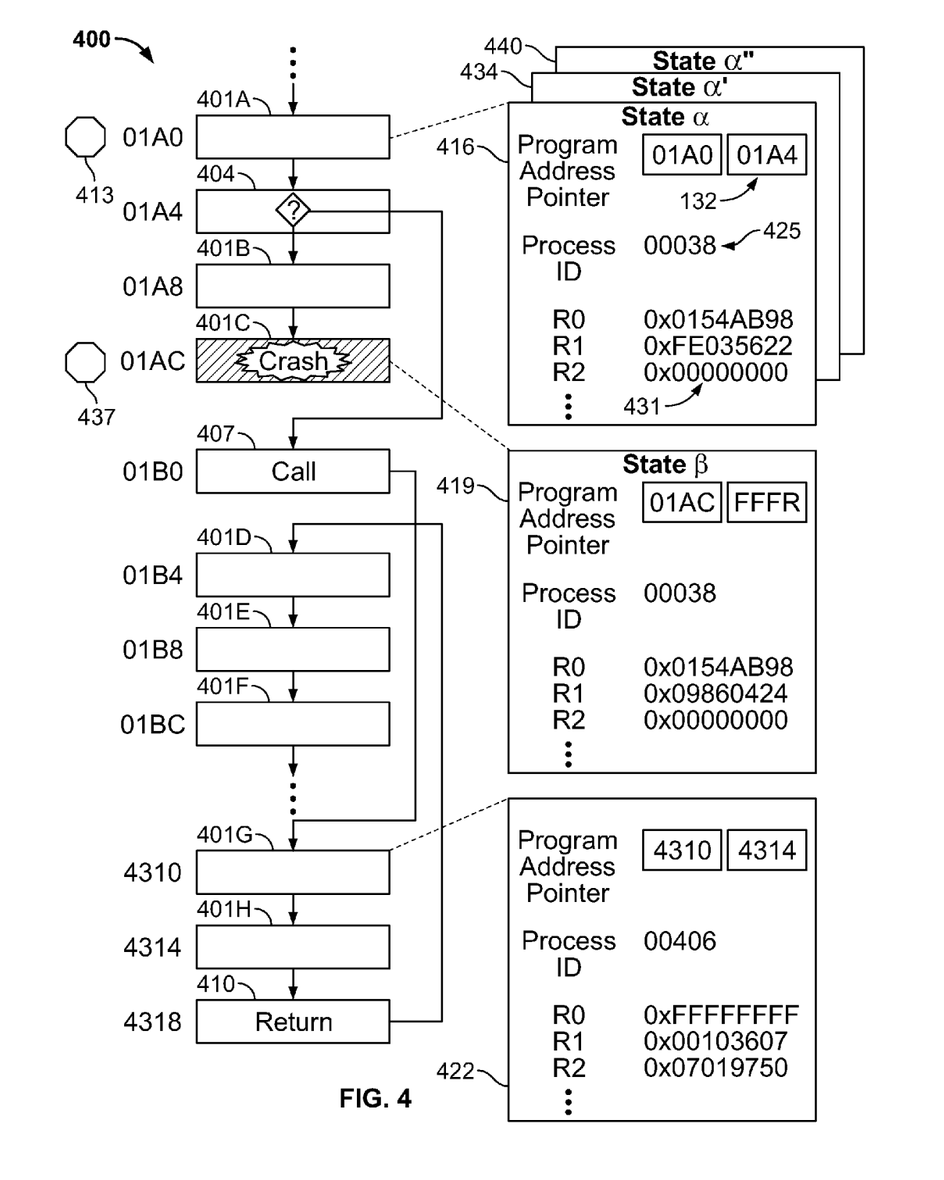
FIG. 4 is a diagram of a sequence of instructions whose execution can be reversed.

A description of how a sequence 400 of programming instructions can be executed and then reversed is now provided with reference to FIG. 4. As shown in FIG. 4, a sequence of instructions 400 can include instructions that execute sequentially, such as instructions 401A-H; branch instructions (e.g., instruction 404) that cause one of two or more execution paths to be taken based on some condition; or instructions to call a function of procedure (e.g., instruction 407) or return from a function or procedure (e.g., instruction 410). A sequence of instructions 400 can include other types of instructions, which are not described here in detail.

Each instruction can be identified by an address of a memory location that stores the instruction. For example, as shown, the instruction 401A has an address value of "01A0." In some implementations, this address is what is stored in the program address pointer 132 (see FIG. 1) and used by the instruction fetch unit 117 to retrieve the next instruction. As described above, the value of the address stored in the program address pointer 132 can be automatically incremented by a fixed amount. In the case of a branch, jump or call instruction that changes the execution flow (e.g., instructions 404 or 407), a different value can be stored in the program address pointer 132, and an appropriate corresponding instruction retrieved.

As depicted in FIG. 4, instructions 401A-H execute sequentially; that is, after each of the instructions 401A-H is fetched, the program address pointer 132 is automatically incremented, and the next instruction is fetched. In particular, when the program address pointer 132 stores the address "01A8," an instruction 401B is fetched; the program address pointer 132 is then incremented to "01AC," and the instruction 401C is fetched. The branch instruction 404 is retrieved when the program address pointer 132 has a value of "01A4." Since the instruction 404 is branch instruction, the next instruction cannot be determined until a condition (depicted by the decision box) is evaluated. Once the condition is evaluated, the program address pointer 132 is updated with either "01A8" or "01B4," and either instruction 401B or instruction 407 is retrieved. The call instruction 407 is retrieved when the program address pointer 132 has a value of "01B0." Once the retrieved call instruction 407 is decoded, the program address pointer 132 is updated with the "4310," and the corresponding instruction 401G is retrieved (e.g., a first instruction and a called function or procedure). When the program address pointer 132 has a value of "4318," the return instruction 410 is decoded, and once this instruction is decoded, the program address pointer 132 is updated with a value of "01B4."

As depicted in FIG. 4, instruction 401C represents an instruction that causes the computing system 100 to "crash." In some implementations, an instruction such as the instruction 401C causes an unexpected fault that "locks up" the resources 101, the operating system 201, or a currently executing application program. For example, the instruction 401C may cause the execution flow to unexpectedly branch to an area of memory that contains no valid programming code. Whatever the result, an instruction such as the instruction 401C is generally a target of a developer who is attempting to debug programming code.

To debug programming code, the developer can use the debugger interface 300 to, for example, set breakpoints in the sequence of instructions 400 that cause the debugger to execute programming instructions up to the breakpoint, then pause. At the breakpoint, the developer can single-step through individual lines of programming code, in an effort to understand why the programming code is causing a crash or other error. For example, the developer can use the debugger interface 300 to set a breakpoint 413 (depicted by a stop sign symbol), then single-step through the code, instruction by instruction.

In a first pass of single-stepping, the developer may execute instructions 404, 401B and 401C—the last of which leads to a crash of the computing system 100. In some implementations, the crash is one that cannot be recovered from, and the developer must restart the debugger and debugger interface to re-execute instructions that precede the breakpoint 413. In other implementations, however, the debugger includes an "undo" feature that allows the debugger to reverse the effects of executing certain instructions. In particular, such an undo feature can allow the developer to reverse the execution back to the instruction that precedes the instruction 401C causing the crash. Once the developer has reversed the execution, he or she can explore information about state, register values, processes, etc., in order to determine what caused the crash. For example, referring to FIG. 3, the developer can use the undo control 315 to reverse execution to a previous instruction, then use the variable frame 327 to explore variable values, register values, stack information, etc., in order to diagnose the cause of the crash. After the execution is reversed, the developer can step back through the code, in a second pass, and monitor the effect of each instruction on the variable values, register values, stack information, etc.

In some implementations, the developer can use the debugger interface 300 to manipulate registers or variable values. For example, the developer may reverse execution to the branch instruction 404, then manipulate a register value in order to, for example, cause the instruction 407 to be fetched, rather than the instruction 401B. Once the instruction 407 is fetched, the developer can select the step-over control 309, for example, to cause instructions 401G, 401H and 410 to be executed in a non-single-step mode; or the developer can select the step-into control 312, for example, to single-step through the instructions 401G, 40H and 410.

To enable an undo feature ("reverse execution") of programming code, some implementations of the debugger save system state, and this state can be restored in the event of a crash. In some implementations, the debugger saves state in response to actions initiated by the debugger user. For example, the debugger can automatically save state each time the user initiates a single-step operation (e.g., using the single-step control 306), a step-over operation (e.g., using the step-over control 309), a step-into operation (e.g., using the step-into control 312, or in response to other actions that are described in more detail below.

Various states corresponding to the computing system 100 are depicted in FIG. 4. For example, state 416 depicts a state of the computing system 100 as the instruction 401A is being executed; state 419 depicts a state of the computing system 100 as the instruction 401C is executed; state 422 depicts a state of the computing system 100 as the instruction 401G is executed. As shown, in some implementations, a state can include the values of the program address pointer 132 (both current and next values are shown in FIG. 4); a process ID 425, which can identify a process in which the current instruction is included; and current values 431 of various registers or pointers. Other information can also be saved with the state described above (e.g., files that may be open, pointers into open files, stack pointers, open network connection channels, pointers to shared memory, etc.)

The computing system 100 can save state in a number of ways. In some implementations, each aspect of state can be pushed onto a stack (e.g., stack 222 shown in FIG. 2), and a number of stack pointers can be maintained, including both the current top-of-stack pointer and a pointer corresponding to the last saved state. Other pointers can also be used to mark out other saved states, in order, for example, facilitate multiple levels of reverse execution.

In some implementations, sequences of instructions are executed as processes that are managed by the operating system 201, and state can be saved through creation of new processes. In particular, some operating systems can create "child" processes that include copies of critical aspects of the computing system 100 state. For example, a child process can store copies of the program address pointer, all of the current register values, and other aspects of state can be saved when a child process is created. In some implementations, creation of a child process results in a substantially identical child process and "parent process." The operating system 201 can suspend one of the processes upon creation of the child process and allow the other process to continue executing. For example, upon creation of a child process, some operating systems suspend the child process and allow the parent process to continue executing. Because the child process can carry with it certain state information of the computing system 100 at the time the child process is created, resuming the suspended child process can have the effect of restoring certain previously saved state and, in effect, "reversing" the effect of execution of certain programming instructions executed by the parent process. In some implementations, the child process can be created by a "fork" instruction through a process that is sometimes referred to as "forking" a process. In some implementations, creating a child process by forking a currently executing process automatically suspends the resulting child process and causes the parent process to continue executing.

An example scenario in which a child process is created in order to save the computing system 100 state is now described with continued reference to FIG. 4. The sequence of instructions 400 can be executed under the control of the debugger. When the program address pointer has the value "01A0," and the instruction 401A is retrieved, the computing system 100 has state 416 (state "α"). A child process can be created having identical state α' 434. The child process having state α' 434 can be suspended, and the parent process having state α 416 can continue executing, resulting in the execution of instructions 404 and 401B. When the computing system 100 attempts to fetch and execute instruction 401C, it crashes. Upon receiving "undo" input from the debugger interface 300 (e.g., input indicating selection of the undo control 315), the debugger can resume the suspended child process with state α' 434, essentially "reversing" execution of the process that caused the crash. A developer or other debugger user can then inspect appropriate state values in the variable frame 237 to determine the cause of the crash.

The process whose execution caused the crash is, in some implementations, terminated. In other implementations, the process is not terminated, but saved in a suspended mode as a "snapshot" of system state as of the point of the crash. In some implementations, the operating system 201 only maintains a fixed number of state-saving processes, after which certain processes are terminated (e.g., the "oldest" processes, "youngest" processes, or processes identified by an algorithm).

In some implementations, receipt of input from the debugger interface 300 to "undo" the execution of a portion of programming code causes a breakpoint 437 to be set, such that the sequence of code between the point at which the child process was created (e.g., as instruction 401A was being processed), and the newly set breakpoint 437 can be "redone." To "redo" the execution of code, the debugger interface 300 can employ a redo control (not shown), which is now further described.

In some implementations, a redo control (not shown) can cause code whose execution has been reversed by an "undo" operation to be re-executed. Referring back to the example scenario described above, in which a child process that has state α' 434 is created, the instructions 401A, 404, 401B and 401C can be fetched and executed, leading to the crash caused by the instruction 401C. When the debugger receives input to "undo" the execution of this code, the suspended child process having state α' 434 can be activated, and a breakpoint 437 can also be set to facilitate a "redo." Upon selection of a redo control, the debugger can cause the process having state α'

434 to be activated, and can continue executing up to the recently set breakpoint 437. Allowing the developer to repeatedly undo and redo the execution of portions of programming code can, in some implementations, help the developer to identify bugs in the code. Before activating the process having state α' 434, another child process can be created having state α" 440 to facilitate yet another undo level.

As described above, execution of some instructions can be reversed by saving and restoring certain aspects of system state. However, the effect of execution of some instructions cannot be "undone" as easily as the effect of execution of other instructions. For example, if an instruction reads from shared memory (e.g., shared memory 225 shown in FIG. 2) or writes to or reads from an input/output interface (e.g., the network 152 shown in FIG. 2), aspects of the computing system 100 state may not be saved, and as such, restoring the computing system 100 state may not restore the aspects that are not saved. For example, a first process that reads from shared memory may be "undone," but not before, in some implementations, a second process causes the shared memory to be overwritten. In some implementations, the shared memory will not be restored to its state prior to being written to by the second process, unless the contents of the shared memory is saved with the state. Because saving the contents of shared memory can be very resource-intensive, this will not always be done. Thus, if the first process is redone after being undone, the subsequent read of the shared memory may not yield the same result as the first read of the shared memory. Similar problems can result if a process whose execution is undone writes to or reads from an input/output interface. For example, the input/output interface may be configured to communicate data in a number of sequential steps. After a first step, the input/output interface may be configured to receive some "handshake" signal before executing a second step; if the first step is re-initiated (e.g., because of execution of a process being undone and redone) before the handshaking signal is received, the input/output interface may be transitioned to an illegal or unexpected state. In such implementations, an undo or redo feature of the debugger can create new problems.

Some implementations of the debugger interface 300 can flag scenarios in which undoing or redoing may cause new problems. In particular, some debuggers detect when a currently executing process reads from shared memory or writes to or reads from an input/output interface, and provides an indication of this in the debug interface 300. More particularly, some debug interfaces include a color-coded undo control 315 (and optionally, a color-coded redo control). The undo control 315 can have one color (e.g., green) when the programming code executed since the last state was saved (e.g., when a child process was created) does not include any reads from shared memory or reads of or writes to an input/output interface; the undo control 315 can have another color (e.g., red or yellow) when the programming code executed since the state was saved does include reads of shared memory or reads of or writes to an input/output interface. In this manner, a debugger user can employ undo or redo debug features but be informed of the potential side effects of such features.

In addition to color-coding the debug controls, some debuggers provide two user-selectable modes for when a portion of code that can otherwise be undone or redone includes reads of shared memory or reads of or writes to and input/output interface. In a first mode, as described above, state is restored upon receipt by the debug interface of an undo command, and each instruction in the programming code whose execution was undone can be re-executed upon receipt of a redo command. In a second mode, each instruction in the programming code whose execution was undone, can be re-executed following a redo command, except those instructions that read from shared memory or read from or write to an input/output interface; such instructions can be skipped.

In order to provide a developer with useful information corresponding to the skipped instructions (corresponding to the second mode described above), the debugger can save and use supplemental state information to provide, for example, appropriate register values to the debugger interface 300. In particular, in the first instance where a value is read from shared memory, the value can be saved as part of a supplemental saved state. If the instruction is subsequently undone, then redone, actual execution of the read of shared memory can be skipped, but corresponding register values can be retrieved from the saved supplemental state and displayed in the variable frame 327. In this manner, the developer can see the original value of the shared memory location, even if another process has subsequently modified the shared memory location. Because this approach, in some implementations, only minimizes, rather than completely eliminates, side effects of undoing or redoing reads of shared memory or writes to or reads from an input/output interfaces, the undo control 315 and redo control 318 can still be color-coded as described above (or possible side effects can be flagged in some other manner).

Figure 5:
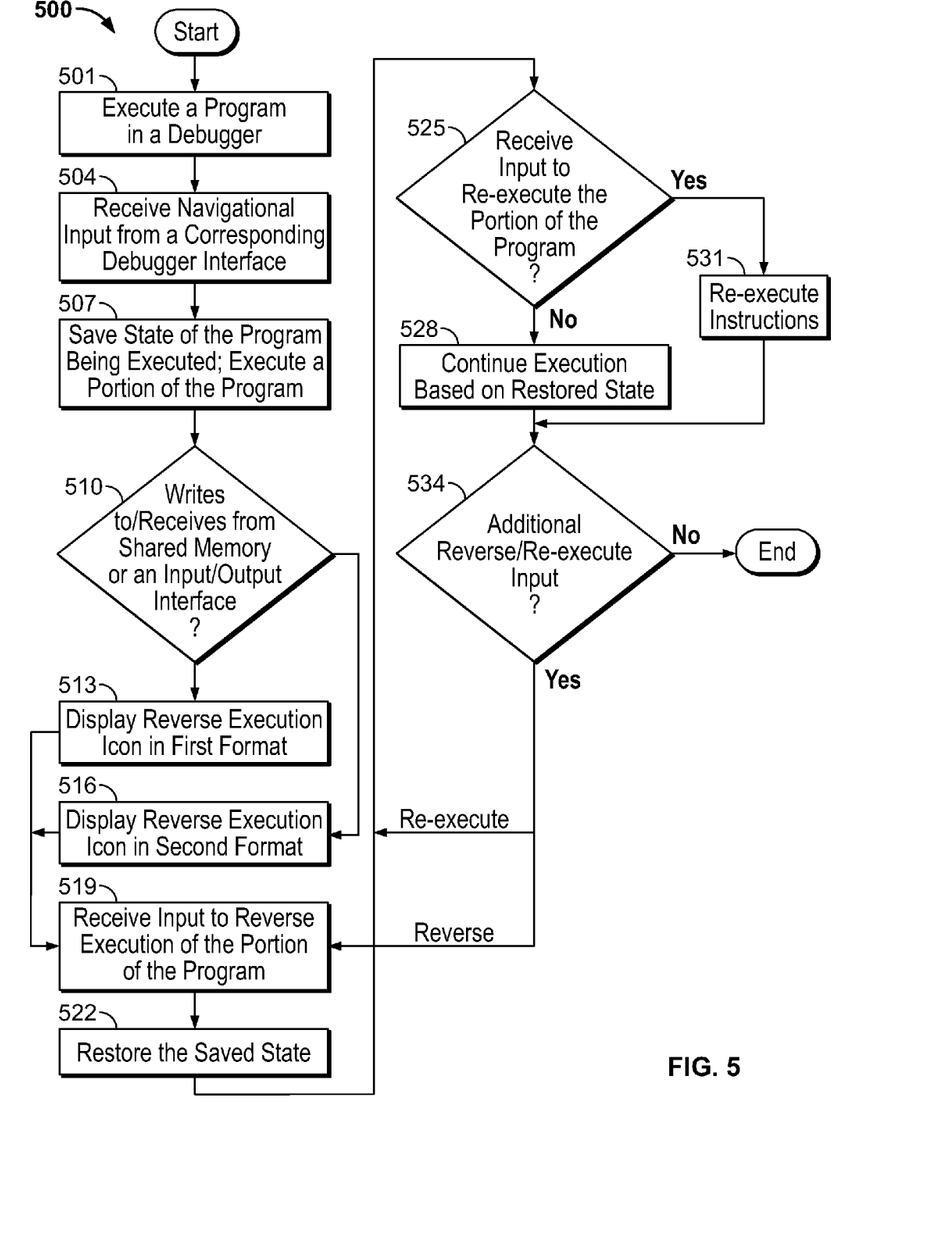
FIG. 5 is a flow diagram illustrating an example method by which execution of certain programming instructions can be reversed.

FIG. 5 is a flow diagram of an exemplary method 500 further illustrating reversing execution of portions of programming code. As shown, the method 500 includes executing (501) a program in a debugger. For example, with reference to the preceding figures, the sequence of instructions 400, can be executed on top of the operating system 201 by the resources 101, under the control of a debugger having a debugger interface 300 and debug resources 231.

Navigational input to traverse portions of the programming code can be received (504) from, for example, a corresponding debugger interface. For example, the operating system 201 can receive (504) navigational input, through the debug resources 231 and the debugger interface 300. The navigational input can include input that indicates a single-step control 306, a step-over control 309, a step-into control 312 or a breakpoint control 321 has been selected.

In response to receiving (504) the navigation input, state of the program can be saved (507) and a portion of the program can be executed (507). For example, the operating system 201 can cause state to be saved. In particular, state a 416 can be saved as a result of the operating system 201 creating a child process from a currently executing process, where the child process has state α' 434 and the parent process has state α 416. To create the processes, the operating system 201 can employ the process manager 213, possibly employing a "fork" operation. In some implementations, actual state can be maintained by the process manager 213 in a stack 222, a file 228A or by some other resource of the resources 101 or operating system 201. After state is saved (507), a portion of the programming code can be executed (507). For example, the instructions 401A, 404, 401B and 401C can be executed (causing, as depicted in FIG. 4, a crash).

As the code is being executed, a determination can be made (510) as to whether any of the code causes a read from shared memory or read of or write to an input/output device. For example, the operating system 201 can employ the debug resources 231 to determine (510) if any of the programming code reads from the shared memory 225 or reads from or writes to an input/output interface, such as, an interface associated with the pointing device 146, the keyboard 143, the video display 149 or the network 152.

If it is determined (510) that code being executed does not read from shared memory or read from or write to an input/output interface, a reverse execution icon can be displayed (513) in a first format. For example, the undo control 315 can be displayed in one color, such as green, to imply that the programming code can be safely "undone." A redo control, if present, can also be displayed in a similar manner.

If it is determined (510) that code being executed does read from the shared memory or reads from or writes to an input/output interface, the reverse execution icon can be displayed (516) in a second format. For example, the undo control 315 (and optionally a redo control) can be displayed in a different color, such as red or yellow, to imply reversing execution of (or re-executing) the programming code may have unintended or unpredictable side effects.

In some implementations, supplemental state can be saved when the programming code includes reads from shared memory or reads of or writes to input/output interface. Such supplemental state can be subsequently used to display information about the reads or writes in a variable frame 327 of the debugger interface 300, even though the effect of actual reads or writes may not be reversed, and even though the reads or writes may not be re-executed when other portions of the programming code are reversed or re-executed.

As shown, the method 500 includes receiving (519) input to reverse execution of the portion of the program. For example, the operating system 201 can receive (519) input from the debugger interface 300 (e.g., selection of the undo control 315) to reverse previous execution of code.

In response to the received (519) input, the previously saved (507) state can be restored (522). For example, the operating system 201 can cause state to be restored. In particular, state α' 434 can be restored, in some implementations, by resuming a previously suspended child process that was earlier created by a fork operation. The operating system 201 can employ the process manager 213 to resume the previously suspended process. In some implementations, a new breakpoint is set before the state is restored (522). For example, the operating system 201 can employ the debug resources 231 to set a new breakpoint 437.

The method 500 includes determining (525) whether input has been received to re-execute the portion whose execution was previously reversed. For example, the operating system 201, through the debug resources 231 and debugger interface 300, can receive input that a user of the debugger has selected a redo control (not shown in FIG. 3).

If it is determined (525) that no re-execution input has been received, execution can be continued (528). For example, execution of the sequence of programming instructions 400 can be continued based on the restored (522) state α 434. In some implementations, execution parameters can be modified following the reverse-execution. For example, in some implementations, the debugger user can modify a value in the variable frame 327 in order to affect a branch path. In particular, with reference to FIG. 4, the debugger user may modify a value to cause instructions 401A, 404, 407, 401D, etc., to be executed (in place of instructions 401D and 401C).

If it is determined (525) that programming instruction are to be re-executed, then the appropriate instructions can be re-executed (531) accordingly. For example, the operating system 201 can cause the previously executed and reversed instructions (e.g., instructions 401A, 404, 401B and 401C) to be re-executed (531). This may result in another crash, but it may also afford the debugger user a chance to monitor certain state information (e.g., information in a thread/process frame 324, the variable frame 327, the high-level code frame 330 or the machine code frame 333).

In some implementations, the re-execution (531) can be performed from a point in the code at which state was last saved, to a point at which a new breakpoint was set in response to a previous undo operation. In some implementations, only the instructions that do not read from shared memory or read from or write to an input/output interface are executed; in such implementations, certain state information in the variable frame 327 can be update based on previously stored supplemental state information—without actual re-execution of the instructions that affect shared memory or the input/output interface.

The method 500 may also include determining (534) whether additional commands to reverse or re-execute programming code have been received, for example, from the debugger interface 300. If such input has been received, the operating system 201 can take appropriate action.

A number of embodiments of the invention have been described. Nevertheless, it will be understood that various modifications may be made without departing from the spirit and scope of the invention. Accordingly, other embodiments are within the scope of the following claims:

What is claimed:

1. A method comprising:
receiving navigational debug input from a debugger interface, the navigational debug input requesting the traversal of input code;
in response to receiving the navigational debug input, saving a state of a program being executed in a corresponding debugger, including creating a child process from a currently executing process, and executing first program instructions corresponding to a portion of the program, wherein executing the program instructions comprises suspending the created child process, and continuing to execute the currently executing process;
receiving input to reverse execution of the first program instructions corresponding to the portion of the program; and
restoring, with one or more computers, the saved state of the program, wherein restoring the saved state of the program comprises suspending the currently executing process, activating the suspended child process, and causing the child process to execute the same first program instructions.

2. The method of claim 1, wherein the navigation input comprises input to single-step, input to step over a function, input to step into a function or input to set a breakpoint in programming code running within the corresponding debugger.

3. The method of claim 1, wherein receiving input to reverse execution of the first program instructions corresponding to the portion of the program comprises receiving input corresponding to selection of a reverse-execution icon in the debugger interface.

4. The method of claim 3, further comprising determining if execution of the first program instructions corresponding to the portion of the program comprises either writing to or reading from shared memory or writing to or reading from an input/output interface.

5. The method of claim 4, further comprising displaying the reverse-execution icon in a first format if execution of the first program instructions corresponding to the portion of the program comprises either writing to or reading from the shared memory or writing to or reading from the input/output interface, and displaying the reverse-execution icon in a different second format if execution of the first program instructions corresponding to the portion of the program does not comprise writing to or reading from the shared memory or writing to or reading from the input/output interface.

6. A method comprising:
executing a program in a debugger;
receiving navigational debug input from a corresponding debugger interface;
in response to receiving the navigational debug input, saving a state of the program being executed in the debugger, including forking a process from a currently executing process, and executing first program instructions corresponding to a portion of the program, wherein executing the first program instructions comprises suspending the forked process, and continuing to execute the currently executing process
receiving input to reverse execution of the first program instructions corresponding to the portion of the program;
in response to the input to reverse execution of the first program instructions corresponding to the portion of the program, setting a breakpoint, using one or more computers, at a location in the program corresponding to a last executed instruction before the input to reverse execution was received and restoring the saved state of the program; wherein restoring the saved state of the program comprises suspending the currently executing process and activating the suspended forked process, and causing the forked process to execute the same first program instructions up to the breakpoint based on the restored saved state.

7. The method of claim 6, wherein receiving navigational debug input comprises receiving input to single-step, step over a function, step into a function or set a breakpoint in programming code running within the debugger.

8. The method of claim 6, wherein receiving input to reverse execution of the first program instructions corresponding to the portion of the program comprises receiving input corresponding to selection of a reverse-execution icon in the debugger interface.

9. The method of claim 8, further comprising determining if execution of the first program instructions corresponding to the portion of the program comprises either writing to or reading from shared memory or writing to or reading from an input/output interface.

10. The method of claim 9, further comprising displaying the reverse-execution icon in a first format if execution of the first program instructions corresponding to the portion of the program comprises either writing to or reading from the shared memory or writing to or reading from the input/output interface, and displaying the reverse-execution icon in a different second format if execution of the first program instructions corresponding to the portion of the program does not comprise writing to or reading from the shared memory or writing to or reading from the input/output interface.

11. The method of claim 10, wherein the first format comprises a first coloring, and the second format comprises a second coloring.

12. The method of 11, wherein the first coloring is red.

13. The method of claim 9, further comprising saving a supplemental state if execution of the first program instructions corresponding to the portion of the program comprises either writing to or reading from the shared memory or writing to or reading from the input/output interface, the supplemental state comprising a value read from or written to the shared memory or the input/output interface.

14. The method of 11, wherein the second coloring is green.

15. The method of claim 6, wherein re-executing the first program instructions corresponding to the portion of the program comprises re-executing only those instructions in the portion of the program that do not write to or read from shared memory or write to or read from an input/output interface.

16. The method of claim 15, further comprising displaying a value from the supplemental state corresponding to an instruction that is not re-executed.

17. The method of claim 6, wherein saving the state of the program comprises saving at least one of current register values of a processor executing the program, a value of an instruction counter that stores addresses of successively executed instructions as the processor executes the program, or a value of a stack pointer that points to a portion of a stack employed by the processor.

18. A non-transitory computer-storage medium encoded with a computer program, the computer program comprising instructions to cause data processing apparatus to perform operations comprising: receiving navigational debug input from a debugger interface;
in response to receiving the navigational debug input, saving a state of a user program being executed in a corresponding debugger, including creating a child process from a currently executing process;
executing first program instructions corresponding to a portion of the user program, wherein executing the program instructions comprises suspending the created child process, and continuing to execute the currently executing process;
receiving input to reverse execution of the first program instructions corresponding to the portion of the user program;
in response to the input to reverse execution of the first program instructions corresponding to the portion of the user program, setting a breakpoint at a location in the user program corresponding to a last executed instruction before the input to reverse execution was received and restoring the saved state of the user program; wherein restoring the saved state of the user program comprises suspending the currently executing process and activating the suspended child process, and causing the child process to execute the same first program instructions
up to the breakpoint based on the restored saved state.

* * * * *

UNITED STATES PATENT AND TRADEMARK OFFICE
CERTIFICATE OF CORRECTION

PATENT NO. : 7,836,430 B2
APPLICATION NO. : 11/490703
DATED : November 16, 2010
INVENTOR(S) : Stanley T. Shebs It is certified that error appears in the above-identified patent and that said Letters Patent is hereby corrected as shown below:

In column 15, line 50, delete "$\alpha$" and insert -- $\alpha'$ --, therefor.

In column 17, line 14, in Claim 6, after "process" insert -- ; --.

In column 17, line 24, in Claim 6, delete "program;" and insert -- program, --, therefor.

In column 18, line 1, in Claim 12, after "of" insert -- claim --.

In column 18, line 9, in Claim 14, after "of" insert -- claim --.

In column 18, lines 26-54, delete "18. A non-transitory computer-storage medium encoded with a
computer program, the computer program comprising instructions to cause data processing apparatus to perform operations comprising: receiving navigational debug input from a debugger interface;
in response to receiving the navigational debug input, saving a state of a user program being executed in a corresponding debugger, including creating a child process from a currently executing process;
executing first program instructions corresponding to a portion of the user program, wherein executing the program instructions comprises suspending the created child process, and continuing to execute the currently executing process;
receiving input to reverse execution of the first program instructions corresponding to the portion of the user program;
in response to the input to reverse execution of the first program instructions corresponding to the portion of the user program, setting a breakpoint at a location in the user program corresponding to a last executed instruction before the input to reverse execution was received and restoring the saved state of the user program; wherein restoring the saved state of the user program comprises suspending the currently executing process and activating the suspended child process, and causing the child process to execute the same Signed and Sealed this
Twenty-fifth Day of October, 2011

David J. Kappos
*Director of the United States Patent and Trademark Office*

CERTIFICATE OF CORRECTION (continued)
U.S. Pat. No. 7,836,430 B2 first program instructions
up to the breakpoint based on the restored saved state." and insert -- 18. A non-transitory computer-storage medium encoded with a computer program, the computer program comprising instructions to cause data processing apparatus to perform operations comprising:
receiving navigational debug input from a debugger interface;
in response to receiving the navigational debug input, saving a state of a user program being executed in a corresponding debugger, including creating a child process from a
currently executing process;
executing first program instructions corresponding to a portion of the user program, wherein executing the program instructions comprises suspending the created child process, and
continuing to execute the currently executing process;
receiving input to reverse execution of the first program instructions corresponding to the portion of the user program;
in response to the input to reverse execution of the first program instructions corresponding to the portion of the user program, setting a breakpoint at a location in the user program corresponding to a last executed instruction before the input to reverse execution was received and restoring the saved state of the user program, wherein restoring the saved state of the user program comprises suspending the currently executing process and activating the suspended child process, and causing the child process to execute the same first program instructions up to the breakpoint based on the restored saved state. --, therefor.